United States Patent
Kopping et al.

(10) Patent No.: US 9,982,123 B2
(45) Date of Patent: May 29, 2018

(54) PROCESS FOR PRODUCING THERMOPLASTIC MOULDING COMPOSITIONS WITH IMPROVED MECHANICAL PROPERTIES

(71) Applicant: INEOS STYROLUTION GROUP GMBH, Frankfurt (DE)

(72) Inventors: Jordan Kopping, Allschwil (CH); Philipp Boeckmann, Bad Duerkheim (DE); Norbert Niessner, Friedelsheim (DE); Lydia Behring, Radebeul (DE)

(73) Assignee: INEOS STYROLUTION GROUP GMBH (DE)

( * ) Notice: Subject to any disclaimer, the term of this patent is extended or adjusted under 35 U.S.C. 154(b) by 0 days. days.

(21) Appl. No.: 15/300,389

(22) PCT Filed: Apr. 1, 2015

(86) PCT No.: PCT/EP2015/057168
§ 371 (c)(1),
(2) Date: Sep. 29, 2016

(87) PCT Pub. No.: WO2015/150450
PCT Pub. Date: Oct. 8, 2015

(65) Prior Publication Data
US 2017/0183489 A1    Jun. 29, 2017

(30) Foreign Application Priority Data
Apr. 2, 2014 (EP) .................................... 14163188

(51) Int. Cl.
    *C08L 83/00*      (2006.01)
    *C08L 25/12*      (2006.01)
    *C08F 265/06*    (2006.01)

(52) U.S. Cl.
    CPC ............ *C08L 25/12* (2013.01); *C08F 265/06* (2013.01); *C08L 2203/12* (2013.01); *C08L 2203/16* (2013.01)

(58) Field of Classification Search
    CPC .. C08L 25/12; C08L 2203/12; C08L 2203/16; C08F 265/06
See application file for complete search history.

(56) References Cited

U.S. PATENT DOCUMENTS

| | | | |
|---|---|---|---|
| 4,224,419 A | 9/1980 | Swoboda et al. | |
| 4,634,734 A | 1/1987 | Hambrecht et al. | |
| 4,788,253 A | 11/1988 | Hambrecht et al. | |
| 4,876,313 A | 10/1989 | Lorah | |
| 5,252,666 A | 10/1993 | Seitz et al. | |
| 5,631,323 A | 5/1997 | Guntherberg et al. | |
| 5,821,302 A | 10/1998 | Rosenau et al. | |
| 5,977,254 A * | 11/1999 | McKee | C08L 51/04 525/401 |
| 6,323,279 B1 * | 11/2001 | Guntherberg | C08F 279/04 525/70 |
| 2011/0275763 A1 | 11/2011 | Niessner | |
| 2016/0319120 A1 * | 11/2016 | Niessner | B33Y 70/00 |
| 2016/0319122 A1 * | 11/2016 | Niessner | C08L 53/02 |
| 2016/0340504 A1 * | 11/2016 | Niessner | C08L 25/12 |

FOREIGN PATENT DOCUMENTS

| | | |
|---|---|---|
| CA | 2143168 A1 | 8/1995 |
| DE | 3149358 A1 | 6/1983 |
| DE | 3227555 A1 | 1/1984 |
| DE | 4006643 A1 | 9/1991 |
| DE | 4131729 A1 | 3/1993 |
| DE | 19802110 A1 | 7/1999 |
| EP | 0006503 A1 | 6/1979 |
| EP | 0535456 A1 | 4/1993 |
| EP | 0669367 A1 | 2/1995 |
| EP | 0716101 A2 | 12/1995 |
| EP | 0698637 A2 | 2/1996 |

\* cited by examiner

Primary Examiner — Hannah Pak
(74) Attorney, Agent, or Firm — J.A. Lindeman & Co., PLLC

(57) ABSTRACT

The invention relates to a process for producing molding compositions containing: a) from 55 to 85% by weight of copolymer A composed of vinylaromatic monomer A1 and a,B-unsaturated monomer A2; b) from 15 to 45% by weight of graft copolymer B with particle size from 50 to 550 nm composed of: B1: from 60 to 80% by weight of rubbery graft base B1 composed of: B11: from 80 to 99% by weight of at least one C2-C8-alkyl acrylate, B12: from 0.5 to 2.5% by weight of cyclic crosslinking agent, B13: from 0 to 2% by weight of non-cyclic crosslinking agent, B2: from 20 to 40% by weight of at least one graft shell B2 composed of: B21: from 60 to 75% by weight of a styrene, B22: from 25 to 40% by weight of acrylonitrile, c) from 0 to 10% by weight of additives C; where the reaction time of the polymerization for producing the graft base B1 is in the range from 2 to 5 h, and the addition of the starting materials takes place over at least two chronological segments.

12 Claims, No Drawings

PROCESS FOR PRODUCING THERMOPLASTIC MOULDING COMPOSITIONS WITH IMPROVED MECHANICAL PROPERTIES

The present invention relates to a process for the production of thermoplastic molding compositions, in particular of molding compositions based on styrene copolymers. Thermoplastic molding compositions with improved mechanical properties can be obtained via optimized conduct of a process in respect of addition of starting materials. These comprise at least one copolymer matrix (e.g. SAN copolymer) and at least one graft polymer based on an acrylate rubber. The invention also relates to thermoplastic moldings and use thereof. The optimized conduct of a process provides thermoplastic molding compositions with improved notched impact resistance.

Production of compositions comprising a copolymer matrix and grafted core-shell polymers by means of polyfunctional compounds is described in U.S. Pat. No. 4,876,313. Emulsion polymerization with use of crosslinking agents leads to graft rubbers which exhibit durable adhesion to one another in both aqueous and nonaqueous solution. The crosslinking agents can be cyclic or noncyclic. A preferred noncyclic crosslinking agent that may be mentioned is alkyl (meth)acrylate (AMA); the quantity of this used in the production of the molding compositions is from 1 to 10% by weight.

Impact-resistant multiphase emulsion copolymers of ASA (acrylonitrile-styrene-acrylate) type have a balanced property profile when the soft acrylate phase, based for example on the monomer butyl acrylate, comprises a crosslinking agent. EP-A 0535456 describes a thermoplastic molding composition with improved impact resistance, comprising a styrene/acrylonitrile copolymer and a multishell graft copolymer, where the core and the first graft shell have been crosslinked by from 0.1 to 10% by weight of a cyclic crosslinking agent, in particular dicyclopentadienyl acrylate (DCPA).

US 2011/0275763 describes production of molding compositions with reduced light scattering. Styrene-acrylonitrile copolymer molding compositions are produced here with at least one acrylic rubber. The thermoplastic composition is composed of a hard component (matrix) and at least two different graft copolymers (rubber components). The compositions in US 2011/0275762 have good notched impact resistance, and in many cases exhibit no "rainbow effect".

The molding compositions have numerous uses: furniture for outdoor use, and components for the construction sector or motor-vehicle sector, have to meet particularly stringent requirements.

The mechanical properties of the thermoplastic ASA molding compositions known in the prior art are not able to meet these requirements in every case.

It is an object of this invention to obtain improved thermoplastic ASA molding compositions via process optimization during production of the molding compositions. This improvement can be achieved by using a specific method for addition of starting materials.

The present invention in particular provides a process for the production of thermoplastic molding compositions comprising (or consisting of):
a) from 55 to 85% by weight of at least one copolymer A composed of at least one vinylaromatic monomer A1, and also of at least one α,β-unsaturated monomer A2;
b) from 15 to 45% by weight of at least one graft copolymer B with average particle size from 50 to 550 nm, composed of (based on B):
from 60 to 80% by weight of at least one rubbery graft base B1 consisting of:
B11: from 80 to 99% by weight of at least one C2-C8-alkyl acrylate,
B12: from 0.5 to 2.5% by weight of the cyclic crosslinking agent dicyclopentadienyl acrylate,
B13: from 0 to 2.0% by weight of another, noncyclic crosslinking agent comprising at least two functional groups,
B14: from 0 to 18% by weight of another copolymerizable monomer;
and from 20 to 40% by weight of at least one graft shell B2 consisting of:
B21: from 60 to 75% by weight of an optionally substituted styrene,
B22: from 25 to 40% by weight of acrylonitrile,
B23: from 0 to 9% by weight of another copolymerizable monomer;
c) from 0 to 10% by weight of other auxiliaries and/or additives C;
where the entirety of components A to C provides 100% by weight of the molding composition, and
where the reaction time of the polymerization for the production of the graft base B1 is in the range from 2 to 5 h, and addition of the starting materials (in particular monomers) takes place across at least two chronological segments.

The present invention also provides a process for the production of thermoplastic ASA molding compositions comprising (or consisting of):
a) from 55 to 85% by weight of at least one copolymer A, composed of styrene monomer A1 and of acrylonitrile monomer A2;
b) from 15 to 45% by weight of at least one graft copolymer B with average particle size from 50 to 550 nm, composed of (based on B):
from 60 to 80% by weight of at least one rubbery graft base B1 consisting of:
B11: from 80 to 99% by weight of at least one C2-C4-alkyl acrylate,
B12: from 0.5 to 2.5% by weight of the cyclic crosslinking agent dicyclopentadienyl acrylate,
B13: from 0 to 2.0% by weight of another, noncyclic crosslinking agent comprising at least two functional groups;
and from 20 to 40% by weight of at least one graft shell B2 consisting of:
B21: from 60 to 75% by weight of styrene,
B22: from 25 to 40% by weight of acrylonitrile;
c) from 0.5 to 5% by weight of other auxiliaries and/or additives C;
where the entirety of components A to C provides 100% by weight of the molding composition, and
where the reaction time of the polymerization for the production of the graft base B1 is in the range from 2 to 5 h, and addition of the starting materials (in particular monomers) takes place across at least three chronological segments.

Familiar methods can be used to mix components A to C in the process for the production of thermoplastic molding compositions. However, particular importance is attached to the manner of production of the graft copolymers B. In many cases, the process for the production of thermoplastic molding compositions uses at least one crosslinking agent B12 and at least one crosslinking agent B13.

The invention also provides a process for the production of a thermoplastic molding composition (in particular ASA molding composition) where the production of the graft base B1 is achieved by carrying out a free-radical-initiated polymerization in emulsion, and addition of the starting materials (monomers) B11 and B12 takes place across at least two chronological segments.

The invention also provides a process for the production of a thermoplastic molding composition (in particular ASA molding composition) where production of the graft base B1 is achieved by using the following steps:
  a) initiation of the polymerization of B11 (C2-C8-alkyl acrylate) in the presence of the cyclic crosslinking agent (B12),
  b) emulsification of the mixture from a),
  c) reaction of the graft base B1 with at least one graft shell B2,
  d) continued polymerization of the mixture from c) and optionally filtration.

The invention also provides a process for the production of a thermoplastic molding composition (in particular ASA molding composition) where from 40 to 95% by weight of component (B11) (C2-C8-alkyl acrylate) are caused to react by an initiator, and then the remaining from 5 to 60% by weight of component (B11) and of the cyclic crosslinking agent (B12) is added. An example of the quantity of the cyclic crosslinking agent (B12) used is from 0.5 to 2.5% by weight, in many cases from 1.2 to 2.0% by weight, based on the quantity of the alkyl acrylate (e.g. nBA).

The invention also provides a process for the production of a thermoplastic molding composition (in particular ASA molding composition) where addition of a monomer mixture made of B11 and B12 for the production of B1 takes place in at least three chronological segments. The invention also provides a process for the production of a thermoplastic molding composition where the time for each of the segment additions is in the range from 20 to 60 min, in particular from 20 to 40 min. The invention also provides a process for the production of a thermoplastic molding composition where a quantity of from 1 to 2% by weight, based on component B1, of dicyclopentadienyl acrylate (DCPA) is used as crosslinker component B12.

The invention also provides a process for the production of a thermoplastic molding composition (in particular ASA molding composition) where component A is a copolymer of styrene (A11) and of acrylonitrile (A12) with molecular weight Mw in the range from 20 000 to 300 000 g/mol, in many cases from 50 000 to 250 000 g/mol. The invention also provides a thermoplastic molding composition, in particular an ASA molding composition, produced by a process as described above.

The invention also provides the use, for the production of moldings, films, fibers, or coatings, of the thermoplastic molding composition (in particular ASA molding composition) obtained by a process. The invention also provides moldings, films, fibers, or coatings which are produced from a molding composition obtained by a process as described.

In an embodiment of the invention, the graft base B1 of the abovementioned thermoplastic molding composition is produced with addition of a cyclic crosslinking agent, preferably dicyclopentadienyl acrylate (DCPA).

The invention also provides the use, for the production of moldings, films, fibers, or coatings for outdoor applications, of the thermoplastic composition produced by way of the optimized process.

The invention likewise provides moldings, films, fibers, or coatings comprising a thermoplastic composition as described above, or consisting of said composition. Specific addition of a certain quantity of crosslinking agent, and the specific method of addition of starting materials during production of the ASA copolymers can achieve not only good mechanical properties but also improved gloss and a good yellowness index, even after prolonged weathering, and this is in particular advantageous for outdoor applications, e.g. motor-vehicle parts.

Component A

A quantity of from 55 to 85% by weight, preferably from 65 to 80% by weight, based on the thermoplastic molding composition, of copolymer A (component A) can be used in the molding composition in the invention.

Component A is known to the person skilled in the art, and can be produced by way of familiar processes, for example free-radical polymerization. Styrene copolymers can be used as component A, in particular SAN, or other rubber-free styrene copolymers. Examples of component A are familiar copolymer matrices, for example styrene-acrylonitrile copolymers (SAN) produced by bulk polymerization, emulsion polymerization, or solution polymerization. Mixtures of matrices are also suitable, examples being those described in Ulmann's Encyclopedia of Industrial Chemistry (VCH-Verlag, 5th edition, 1992, pp. 633 ff.).

Component A in the invention is composed of from 60 to 70% by weight, preferably from 65 to 70% by weight, of component A1 (monomer A1), and of from 30 to 40% by weight, preferably from 30 to 35% by weight, of component A2, based on the total weight of component A. The styrene:acrylonitrile ratio of component A is by way of example 75:25. In another preferred embodiment, the styrene:acrylonitrile ratio of component A is 73:27.

Monomers of component A1 can be vinylaromatic monomers, e.g. styrene and styrene derivatives, examples being α-methylstyrene and ring-alkylated styrenes such as p-methylstyrene and/or tert-butylstyrene. It is particularly preferable to use styrene and α-methylstyrene.

Monomers used for component A2 (monomer A2) are α,β-unsaturated components, preferably acrylonitrile and/or methacrylonitrile, preference being given to acrylonitrile.

Another embodiment of the invention produces a molding composition which comprises one or more styrene copolymers A (copolymer A), where this styrene copolymer A is composed of two or three monomers from the group of styrene, acrylonitrile, and/or α-methylstyrene.

The styrene copolymer A is preferably produced from the components acrylonitrile and styrene and/or α-methylstyrene by bulk polymerization or in the presence of one or more solvents. Preference is given here to copolymers A with molar masses $M_w$ of from 15 000 to 500 000 g/mol, preferably from 20 000 to 300 000 g/mol, particularly preferably from 30 000 to 250 000 g/mol, where the molar masses can be determined by way of example by light scattering in tetrahydrofuran (GPC with UV detection).

Component A is preferably produced by means of bulk polymerization, emulsion polymerization, or solution polymerization. It is particularly preferable that the polymerization is carried out in from 0 to 20% by weight of aromatic solvents, for example toluene, xylene, or ethylbenzene. Further details concerning the production of component A can also be found in Kunststoff-Handbuch [Plastics handbook] (Vieweg-Daumiller, vol. V Polystyrol [Polystyrene], Carl-Hanser-Verlag, Munich, 1969, p. 124, line 12 ff.).

Component B

Quantities of component B (graft copolymer B) used in the molding composition are from 15 to 45% by weight, preferably from 20 to 35% by weight. Component B is at least one graft copolymer, and comprises a graft base B1 and at least one graft shell B2.

Quantities of the graft base B1 used in component B are from 50 to 90% by weight, preferably from 60 to 80% by weight, particularly preferably from 62 to 78% by weight.

Compounds that can generally be used as monomers (B11) for production of the rubbery graft base B1 are alkyl (meth)acrylates comprising a straight-chain or branched alkyl moiety having from 2 to 8 carbon atoms, preferably from 2 to 4 carbon atoms. Preference is given to alkyl acrylates comprising a straight-chain or branched alkyl moiety preferably having from 2 to 8 carbon atoms, particularly preferably having from 2 to 4 carbon atoms, in particular n-butyl acrylate. The alkyl (meth)acrylates can be used individually or in a mixture during production of the graft base B1.

In many cases, the rubbery graft base moreover comprises, as component, at least one cyclic crosslinking agent (B12), and optionally one noncyclic crosslinking agent (B13). By way of example, from 0.5 to 2.5% by weight of the acrylate of tricyclodecenyl alcohol (dicyclopentadienyl acrylate; DCPA) and from 0 to 2.0% by weight of allyl methacrylate are used.

The rubbery graft base B1 can moreover comprise up to 18% by weight of other copolymerizable monomers (B14). In many cases, however, no other crosslinking agents (B14) are present. Examples of suitable monomers (B14) that can be used are divinylbenzene, diallyl maleate, diallyl fumarate, triallyl cyanurate, and/or diallyl phthalate.

Quantities of the graft shell B1 used in component B are from 10 to 50% by weight, preferably from 20 to 40% by weight, particularly preferably from 38 to 22% by weight.

Suitable monomers B21 for the production of the at least one graft shell B2 are vinylaromatic monomers such as styrene and/or styrene derivatives, for example alkyl-styrene, preferably α-methylstyrene, and ring-alkylated styrenes such as p-methylstyrene and/or tert-butylstyrene. It is preferable to use styrene. Examples of quantities used of monomers B21 are from 55 to 80% by weight, preferably from 60 to 75% by weight, particularly preferably from 58 to 73% by weight, based on the graft shell B2.

An example of a polar copolymerizable unsaturated monomer (B22) for the graft shell B2 is acrylonitrile, but it is also possible to use methacrylonitrile. Examples of quantities used of monomers B22 are from 20 to 45% by weight, preferably from 25 to 40% by weight, particularly preferably from 27 to 38% by weight, based on the graft shell B2.

Examples of compounds that can be used as possible other copolymerizable monomers (B23) are the following: acrylic acid, methacrylic acid, maleic anhydride, methyl methacrylate, ethyl methacrylate, phenylmaleimide, acrylamide, and vinyl methyl ether.

It is preferable that (B23) is methyl methacrylate and/or maleic anhydride. Examples of quantities used of monomers B23 are from 0 to 20% by weight, preferably from 0 to 9% by weight, particularly preferably from 0 to 7% by weight, based on the graft shell B2.

It is well known that graft copolymers can be produced from an elastomeric rubbery graft base B1 and a graft shell B2 (DE 4006643 A1, p. 2, line 65 to p. 3, line 43; DE 4131729 A1, p. 3, line 12 to p. 4, line 49). Coarse-particle graft copolymers B can be produced by grafting in two stages (DE-A 3227555, component B: p. 8, line 14 to p. 10, line 5, and DE-A 3149358, p. 8, line 14 to p. 10, line 5).

In the general method for the production of the graft copolymers B, the rubbery acrylate polymer B1 serving as graft base is first produced, for example by emulsion polymerization, in that by way of example alkyl acrylate (B11) and the crosslinking agent (B12), and optionally (B13) and/or (B14) are polymerized by way of example in aqueous emulsion in a manner known per se at temperatures of from 20 to 100° C., preferably from 50 to 80° C., in many cases from 55 to 70° C.

A mixture of vinylaromatic monomers (B21) with a polar copolymerizable unsaturated monomer (B22), and also optionally other monomers (B23) can be grafted on this resultant polyacrylate rubber; this graft copolymerization is preferably carried out in aqueous emulsion.

A preferred embodiment uses from 1.2 to 2.0% by weight of DCPA, based on the graft base (B1), for production of the graft copolymers B. Particular preference is given to a quantity of DCPA in the range from 1.3 to 1.7% by weight.

The monomer mixture for production of the graft base B1 can be added in one step, or in many cases in a plurality of steps. In a preferred embodiment, the monomer mixture is added in at least 3 steps (chronological segments). From 1 to 50% by weight of the monomer mixture of B1 are added in a first segment.

With a total feed time of from 2 to 4 h, preferably from 2 h 30 min to 3 h 30 min, for the monomer mixture for production of B1, segment duration is from 10 to 60 min, preferably from 25 to 45 min. Segment duration can moreover also in principle be varied within the feed time. Procedures can also differ in quantities added.

During production of the graft base B1 of the graft copolymer B, it is possible that component B11, preferably C2-C8-alkyl acrylate, is used all at once as a charge with the crosslinking agent, or that from 40 to 99% by weight of component B11, preferably from 60 to 95% by weight, is used as a charge.

If component B11 is used as a charge, a mixture of the remaining components for production of B1 can be added. It is preferable that the remaining components are added in individual chronological segments. The components of the graft shell B2 are preferably added separately with a feed time of from 2 to 4 hours.

The product of the process of the invention for producing the graft copolymer B depends on the conduct of the process, and can be either small-particle or large-particle graft copolymers.

Component C

The compositions can comprise additions C, in particular auxiliaries and additives. Quantities of from 0 to 10% by weight, preferably from 0 to 8% by weight, in many cases from 0.5 to 5% by weight, based on the thermoplastic molding composition, of the conventional auxiliaries can be used during the polymerization.

Examples that may be mentioned are emulsifiers, polymerization initiators, buffer substances, molecular weight regulators, plasticizers, antistatic agents, fillers, light stabilizers, lubricants, blowing agents, adhesion promoters, optionally other compatible thermoplastics, fillers, surfactant substances, flame retardants, dyes and pigments, stabilizers with respect of oxidation, hydrolysis, light (UV), heat, or discoloration, and/or reinforcing agents.

Emulsifiers used are alkali metal salts of alkyl- or alkylsulfonic acids, alkyl sulfates, fatty alcohol sulfonates, salts of higher fatty acids having from 10 to 30 carbon atoms, or resin soaps. Examples of polymerization initiators that can be used are conventional persulfates, for example potassium persulfate, and known redox systems.

Examples of buffer substances that can be used and that adjust to a pH which is preferably from 6 to 9 are sodium hydrogencarbonate and/or sodium pyrophosphate, and examples of molecular weight regulators that can be used are mercaptans, terpinols, and/or dimeric o-methylstyrene. The quantity optionally used of the molecular weight regulators is from 0 to 3% by weight, based on the weight of the reaction mixture.

It is also possible to use additives, examples of quantities being from 0 to 10% by weight. Light stabilizers used can be any of the conventional light stabilizers, for example compounds based on benzophenone, on benzotriazole, on cinnamic acid, or on organic phosphites and phosphonites; it is also possible to use sterically hindered amines.

Lubricants can by way of example be hydrocarbons such as oils, paraffins, PE waxes, PP waxes, fatty alcohols having from 6 to 20 carbon atoms, ketones, carboxylic acids such as fatty acids, montanic acid, or oxidized PE wax, carboxamides, or else carboxylic esters, e.g. with the alcohols ethanol, fatty alcohols, glycerol, ethanediol, pentaerythritol, and with long-chain carboxylic acids as acid component.

Stabilizers used can be conventional antioxidants, for example phenolic antioxidants, e.g. alkylated monophenols, esters and/or amides of β-(3,5-di-tert-butyl-4-hydroxy-phenylpropionic acid, and/or benzotriazoles. Possible antioxidants are mentioned by way of example in EP-A 698637 and EP-A 669367. Specific mention may be made of the following as phenolic antioxidants: 2,6-di-tert-butyl-4-methylphenol, pentaerythrityl tetrakis[3-(3,5-di-tert-butyl-4-hydroxyphenyl)propionate, and N,N'-di(3,5-di-tert-butyl-4-hydroxyphenylpropionyl)hexamethylenediamine. The stabilizers mentioned can be used individually or in combination.

Examples of other compatible thermoplastics that can be used are polyesters (e.g. polyethylene terephthalate, polybutylene terephthalate), PMMA, polycarbonate, polyamide, polyoxymethylene, polystyrene, polyethylene, polypropylene, polyvinyl chloride.

These auxiliaries and/or additives can either be used during production of thermoplastic component A or added to component A and/or B during production of the composition.

For production of the thermoplastic composition of the invention, the particulate graft polymers B described above are incorporated into the copolymers A. The incorporation can be achieved by way of example in that the particulate graft polymer(s) is/are isolated from the emulsion by addition of an electrolyte and then, optionally after drying, is/are mixed with the hard component by extruding, kneading, or rolling these together. The auxiliaries and/or additives described above can also be added during production of said mixture.

The invention provides the production of the thermoplastic copolymer compositions via mixing of the abovementioned components, and the uses, for outdoor applications, of moldings produced from the polymer mixtures of the invention.

The invention moreover provides moldings produced from the production process relating to the polymer compositions of the invention.

The polymer compositions of the invention can by way of example be pelletized or granulated, or processed by well known processes, for example by extrusion, injection molding, blow molding, or calendering, to give moldings of any type, for example cable sheathing, films, hoses, profiles, shoe shells, shoe soles, technical moldings (such as motor-vehicle parts); consumer items, furniture for indoor and outdoor use, coatings, bellows, and/or livestock ear tags.

The thermoplastic molding compositions obtained from the production process of the invention in particular feature improved mechanical properties (such as notched impact resistance) in the moldings. The thermoplastic molding compositions obtained by way of the optimized production process are therefore in particular used in the production of moldings, films, and fibers, and by way of example the moldings here can be used in the construction sector or as motor-vehicle components. The advantages of the improved mechanical properties will be described with reference to the examples below.

The examples and the claims provide a more detailed explanation of the invention.

Methods:

Swelling index and gel content were determined by mixing 7 g of dispersion and 7 g of water and drying the resultant film overnight in a drying oven at about 700 mbar and 70° C. in a stream of nitrogen. 40 ml of toluene are then admixed with 2 g of polymer film. The film was swollen overnight, and the toluene was then removed. The swollen film was weighed and then dried in vacuo overnight. The dried film was weighed, and gel content and swelling index were calculated.

Soluble fractions were extracted by admixing 500 ml of acetone with 2.5 g of the material, and swelling for two days. The suspension was filtered through kieselguhr; acetone was used for washing, and the product was dried. The filtrate was removed in vacuo.

Solids content was determined by using commercially available Halogen Moisture Analyzer equipment (HR73 from METTLER TOLEDO).

The rubber samples (graft copolymers) for GPC and GPEC were swollen overnight in THF and filtered before measurement. GPC uses the size exclusion principle. 100 µl were injected into a column system with a precolumn and two separating columns. THF was used as eluent; flow rate was 1 ml/min at 35° C. Detector used comprised a UV detector and a differential refractometer (DRI).

GPEC uses the precipitation chromatography principle. A solvent gradient was generated with a mixture of acetonitrile and THF with varying composition as eluent. 20 µl were injected at 80° C. with a flow rate of 5 ml/min. A commercially available Evaporative Light Scattering Detector (Varian ELSD 2100) was used.

Mixtures of the components were produced by mixing the respective components intimately in a commercially available extruder (ZSK 30 twin-screw extruder from Werner & Pfleiderer) at a temperature of 240° C.

Charpy Notched Impact Resistance [kJ/m$^2$]:

Notched impact resistance is determined on test samples (80×10×4 mm, produced by injection molding at melt temperature 240° C. and mold temperature 70° C.) at 23° C. in accordance with ISO 179-1A (of 2010).

Flowability (MVR [ml/10 min]):

Flowability is determined on a polymer melt at 220° C. with 10 kg loading in accordance with ISO 1133 (of 2011).

Vicat Softening Point (° C.):

Softening point is determined in accordance with ISO 306: 2004.

The test samples for the mechanical tests and the transmission micrographs were manufactured by the injection-molding process.

GENERAL EXPERIMENTAL METHOD
(EXAMPLES 1 to 8)

Production of Polymer Component B by Free-Radical-Initiated Polymerization in Emulsion Deionized water, sodium hydrogencarbonate, and K 30 emulsifier are charged, and the flask is heated to 59° C. A mixture of n-butyl acrylate (nBA) and DCPA is then used as a charge in the feed vessels of the metering unit.

In the case of chronological variations in crosslinking agent addition, most of the nBA is used as a charge in a separate vessel. After addition of the potassium peroxodisulfate initiator, the monomer mixture is added automatically in accordance with the defined program, then the system is heated to 61° C., and polymerization is continued for one hour. The system is then cooled to room temperature, and the synthesis of the base is thus terminated. Water and K 30 emulsifier are then added.

The mixture is then heated to 61° C. Once the monomer mixture of styrene and acrylonitrile has been charged in the feed vessels of the metering unit, potassium peroxodisulfate is dissolved in water and added to the reaction mixture. The monomers of the graft are automatically metered into the system in accordance with the prescribed program.

Finally, polymerization is continued for one hour at 65° C. Once the system has cooled to room temperature, the synthesis of the graft has ended, and a sample is taken. The reaction mixture is drawn off, and any coagulate formed is removed by filtration. The resultant rubber is precipitated in the precipitation vessel. This gives the moist rubber, which retains about 30% water content.

With a total feed time of from 2 to 4 h, preferably from 2 h 30 min to 3 h 30 min, for the monomer mixture for production of B1, segment duration is from 10 to 60 min, in many cases from 25 to 45 min.

Table 1 below lists the precise mass data for the starting materials for the synthesis with the various proportions of DCPA.

Table 2 shows the mechanical properties of the various SAN-graft-copolymer compositions (SAN matrix with styrene:acrylonitrile=65:35, $M_w$=160 000 g/mol).

TABLE 2

Compositions of rubber of the invention with SAN, and mechanical properties measured on the moldings

| Example | 1 | 3 | 4 | 5 | 7 | 8 |
|---|---|---|---|---|---|---|
| DCPA in %, based on nBA | 1.20 | 1.40 | 1.50 | 1.60 | 1.80 | 2.00 |
| Rubber content in % | 33.1 | 32.5 | 32.9 | 33.1 | 32.3 | 32.8 |
| Charpy | | | | | | |
| kJ/m² (23° C.) | 4.71 | 6.85 | 3.19 | 4.96 | 4.42 | 6.43 |
| kJ/m² (0° C.) | 4.05 | 4.27 | 2.87 | 3.65 | 3.50 | 4.40 |
| kJ/m² (0-23° C.) | 2.32 | 1.51 | 2.13 | 2.47 | 2.12 | 2.09 |
| MVR ml/10 min | 58.7 | 55.6 | 55.9 | 51.3 | 53.6 | 50.5 |
| Vicat ° C. | 97.8 | 97.1 | 97.5 | 97.8 | 98.2 | 98.0 |
| Swelling index | 24.10 | 21.03 | 18.15 | 17.93 | 15.77 | 17.45 |

Experiment 2

The program for metering of the monomer mixture into the system (chronological segments) is varied. Most of the nBA here is metered at constant rate into the system, and a small portion is mixed with the DCPA and added in accordance with the variable program. The quantity of DCPA used, based on the monomer mixture, is 1.5%. Addition takes place as listed in table 3. Table 4 shows the mechanical properties of the molding compositions (in the form of moldings) comprising SAN.

TABLE 1

Examples 1 to 8 differ in DCPA content and in the nature of the feed. Unless otherwise indicated, the quantities used of the substances are stated in g.

| | Example | 1 | 2 | 3 | 4 | 5 | 6 | 7 | 8 |
|---|---|---|---|---|---|---|---|---|---|
| Charge | DCPA in %, based on nBA | 1.20 | 1.30 | 1.40 | 1.50 | 1.60 | 1.70 | 1.80 | 2.00 |
| | Water | 2807.28 | 2807.28 | 2807.28 | 2807.28 | 2807.28 | 2807.28 | 2807.28 | 2807.28 |
| | K₂(SO₄)₂ | 5.67 | 5.67 | 5.67 | 5.67 | 5.67 | 5.67 | 5.67 | 5.67 |
| | NaHCO₃ | 7.25 | 7.25 | 7.25 | 7.25 | 7.25 | 7.25 | 7.25 | 7.25 |
| | K30 emulsifier | 47.25 | 47.25 | 47.25 | 47.25 | 47.25 | 47.25 | 47.25 | 47.25 |
| Feed 1, portion 1 | nBA | 0.00 | 1500.03 | 0.00 | 1500.03 | 0.00 | 1500.03 | 0.00 | 0.00 |
| Feed 1, portion 2 | nBA | 1867.32 | 365.40 | 1863.54 | 361.62 | 1859.76 | 357.84 | 1855.98 | 1852.20 |
| | DCPA | 22.68 | 24.57 | 26.46 | 28.35 | 30.24 | 32.13 | 34.02 | 37.80 |
| Addition 1 | Water | 2869.65 | 2869.65 | 2869.65 | 2869.65 | 2869.65 | 2869.65 | 2869.65 | 2869.65 |
| | K30 emulsifier | 8.66 | 8.66 | 8.66 | 8.66 | 8.66 | 8.66 | 8.66 | 8.66 |
| Addition 2 | Water | 100.17 | 100.17 | 100.17 | 100.17 | 100.17 | 100.17 | 100.17 | 100.17 |
| | K₂(SO₄)₂ | 5.04 | 5.04 | 5.04 | 5.04 | 5.04 | 5.04 | 5.04 | 5.04 |
| Feed 2 | Styrene | 945.00 | 945.00 | 945.00 | 945.00 | 945.00 | 945.00 | 945.00 | 945.00 |
| | Acrylonitrile | 315.00 | 315.00 | 315.00 | 315.00 | 315.00 | 315.00 | 315.00 | 315.00 |

The resultant moist rubber is further processed in the extruder, firstly to give the concentrate (50% rubber content) and finally to give the finished blend (30% rubber content), and the mechanical properties of the resultant product are tested.

Experiment 1

In the first part of the experiment, the concentration of DCPA in the nBA/DCPA monomer mixture is varied stepwise. Rubbers with DCPA concentrations of 1.2%, 1.4%, 1.5%, 1.8%, and 2.0% (based on nBA) are produced.

TABLE 3

| | Segment No. | | | | |
|---|---|---|---|---|---|
| | 1 | 2 | 3 | 4 | 5 |
| | Segment duration in min | | | | |
| Experiment | 40 | 40 | 40 | 40 | 40 |
| | Monomer mixture added in % by weight | | | | |
| A | 50 | 25 | 20 | 5 | 0 |
| B | 40 | 40 | 10 | 10 | 0 |

TABLE 3-continued

| | Segment No. | | | | |
|---|---|---|---|---|---|
| | 1 | 2 | 3 | 4 | 5 |
| | Segment duration in min | | | | |
| | 40 | 40 | 40 | 40 | 40 |
| Experiment | Monomer mixture added in % by weight | | | | |
| C | 30 | 30 | 20 | 10 | 10 |
| D | 30 | 20 | 0 | 20 | 30 |
| E | 40 | 15 | 10 | 15 | 20 |
| F | 5 | 25 | 40 | 25 | 5 |
| G | 35 | 25 | 10 | 0 | 30 |
| H | 35 | 35 | 10 | 0 | 20 |

The experiments (different procedures A-H) differ in the quantity of the monomer mixture added, and also in the number of chronological segments of the monomer mixture.

TABLE 4

Charpy, MVR, Vicat, and swelling index as a function of the various procedures with 1.5% of DCPA (based on nBA). Molding compositions using continuous feed (1.5% and 2.0% of DCPA) serve as comparison.

| | | | Charpy | | | | |
|---|---|---|---|---|---|---|---|
| | | DCPA in %, based on nBA | kJ/m$^2$ (23° C.) | kJ/m$^2$ (0° C.) | kJ/m$^2$ (0-23° C.) | MRV ml/10 min | Vicat ° C. | Swelling index |
| Procedures | A | 1.5 | 3.22 | 2.90 | 2.11 | 56.0 | 98.2 | 13.69 |
| | B | 1.5 | 5.64 | 3.76 | 2.00 | 52.8 | 98.3 | 12.41 |
| | C | 1.5 | 3.58 | 3.47 | 1.92 | 54.9 | 82.2 | 12.89 |
| | D | 1.5 | 6.90 | 3.55 | 2.28 | 50.8 | 98.1 | 12.30 |
| | E | 1.5 | 5.76 | 4.21 | 4.26 | 48.9 | 97.5 | 13.43 |
| | F | 1.5 | 5.08 | 4.23 | 2.26 | 52.8 | 98.2 | 15.13 |
| | G | 1.5 | 3.58 | 3.55 | 1.56 | 52.7 | 100.8 | 13.48 |
| | H | 1.5 | 3.43 | 2.89 | 1.87 | 46.1 | 101.6 | 14.81 |
| | comp-a | 1.5 | 3.19 | 2.87 | 2.13 | 55.9 | 97.5 | 18.15 |
| | comp-b | 2.0 | 6.43 | 4.40 | 2.09 | 50.5 | 98.0 | 17.45 |

For procedure D, with the lowest swelling index, further experiments were carried out with DCPA concentrations of 1.3% and 1.7%. Table 5 shows that the molding composition from procedure D has a particularly good combination of mechanical properties.

In particular with 1.3% DCPA content, based on nBA, the ASA molding composition has advantageous mechanical properties and low swelling index.

Table 5 shows the values for Charpy, MVR, Vicat, and swelling index as a function of procedures B and D with 1.3%, 1.5%, and 1.7% of the crosslinking agent DCPA.

| | DCPA in %, based on nBA | Procedure D | | |
|---|---|---|---|---|
| | | 1.3 | 1.5 | 1.7 |
| Charpy | | | | |
| kJ/m$^2$ | (23° C.) | 6.70 | 6.90 | 5.70 |
| kJ/m$^2$ | (0° C.) | 4.40 | 3.55 | 3.84 |
| kJ/m$^2$ | (0-23° C.) | 2.31 | 2.28 | 2.16 |
| MVR | ml/10 min | 60.7 | 50.8 | 57.5 |
| Vicat | ° C. | 98.1 | 98.1 | 98.5 |
| Swelling index | | 11.24 | 12.30 | 13.05 |

In view of significantly smaller swelling index and improved heat resistance, and appropriate notched impact resistance and rheology, the process of the invention provides thermoplastic molding compositions with improved mechanical properties.

Experiment 3

Feed time is varied with constant content of 1.5% of DCPA crosslinking agent (based on nBA). The monomer mixture is added continuously over 3 h 30 min, or over 3 h, or over 2 h 30 min. No improvements are observed in mechanical properties in comparison with the procedures using a variety of segments.

What is claimed is:

1. A process for the production of a thermoplastic molding composition comprising:
    a) from 55 to 85% by weight of at least one copolymer A composed of at least one vinylaromatic monomer A1, and also at least one α,β-unsaturated monomer A2;
    b) from 15 to 45% by weight of at least one graft copolymer B with average particle size from 50 to 550 nm, composed of:
    from 60 to 80% by weight of at least one rubbery graft base B1 consisting of:
    B11: from 80 to 99% by weight of at least one C2-C8-alkyl acrylate,
    B12: from 0.5 to 2.5% by weight of a cyclic crosslinking agent selected form dicyclopentadienyl acrylate,
    B13: from 0 to 2.0% by weight of a noncyclic crosslinking agent comprising at least two functional groups,
    B14: from 0 to 18% by weight of a further copolymerizable monomer; and from 20 to 40% by weight of at least one graft shell B2 consisting of:
    B21: from 60 to 75% by weight of an optionally substituted styrene,
    B22: from 25 to 40% by weight of acrylonitrile,
    B23: from 0 to 9% by weight of a further copolymerizable monomer;
    c) from 0 to 10% by weight of other auxiliaries and/or additives C;
    where the entirety of components A to C provides 100% by weight of the molding composition, and where the reaction time of the polymerization for the production of the graft base B1 is in the range from 2 to 5 h, and addition of mixture of components B11, B12, B13, and B14 for the production of B1 takes place over at least two chronological segments.

2. The process for the production of a thermoplastic molding composition as claimed in claim 1, where the production of the graft base B1 is achieved by carrying out a free-radical polymerization in emulsion, and addition of the monomer mixture of B11 and B12 takes place over at least two chronological segments.

3. The process for the production of a thermoplastic molding composition as claimed in claim 1, where production of the graft base B1 is achieved by using the following steps:
   a) initiation of the polymerization of C2-C8-alkyl acrylate (B11) in the presence of the cyclic crosslinking agent (B12),
   b) emulsification of the mixture from a),
   c) reaction of the graft base B1 with at least one graft shell B2,
   d) continued polymerization of the mixture from c) and optionally filtration.

4. The process for the production of a thermoplastic molding composition as claimed in claim 1, where addition of a monomer mixture made of B11 and B12 for the production of B1 takes place over at least three chronological segments.

5. The process for the production of a thermoplastic molding composition as claimed in claim 1, characterized in that the time for each of the segment additions for the production of B1 is in the range from 20 to 60 min.

6. The process for the production of a thermoplastic molding composition as claimed in claim 1, characterized in that a quantity of from 1 to 2% by weight, based on component B1, of dicyclopentadienyl acrylate (DCPA) is used as cyclic crosslinking agent B12.

7. The process for the production of a thermoplastic molding composition as claimed in claim 1, characterized in that copolymer A is a copolymer of styrene (A11) and of acrylonitrile (A12) with molecular weight Mw in the range from 20 000 g/mol and 300 000 g/mol.

8. The process for the production of a thermoplastic molding composition as claimed in claim 1, characterized in that copolymers A and B are mixed with from 0.5 to 5% by weight of other auxiliaries and/or additives C.

9. A thermoplastic molding composition produced by the process as claimed in claim 1.

10. A method of use of the thermoplastic molding composition obtained by the process as claimed in claim 1 for the production of moldings, films, fibers, or coatings, wherein the thermoplastic molding composition is processed by extrusion, injection molding, or calendaring.

11. A molding, film, fiber, or coating which is produced from the molding composition obtained by the process as claimed in claim 1.

12. The process for the production of a thermoplastic molding composition as claimed in claim 5, characterized in that the time for each of the segment additions is in the range from 20 to 40 min.

* * * * *